United States Patent [19]

Yamano

[11] Patent Number: 5,752,106
[45] Date of Patent: May 12, 1998

[54] AUTOMATIC FOCUS CAMERA

[75] Inventor: Shozo Yamano, Tokyo, Japan

[73] Assignee: Nikon Corporation, Tokyo, Japan

[21] Appl. No.: 492,137

[22] Filed: Jun. 19, 1995

[30] Foreign Application Priority Data

Sep. 7, 1994 [JP] Japan .................................. 6-213404

[51] Int. Cl.$^6$ .................................................. G03B 13/36
[52] U.S. Cl. ........................ 396/263; 396/89; 396/91; 396/264
[58] Field of Search .................... 354/267.1, 286, 354/402; 396/89, 91, 93, 263, 264

[56] References Cited

U.S. PATENT DOCUMENTS

| | | |
|---|---|---|
| 4,561,749 | 12/1985 | Utagawa . |
| 4,974,002 | 11/1990 | Ohnuki et al. . |
| 5,040,015 | 8/1991 | Hamada et al. . |
| 5,212,513 | 5/1993 | Ishida et al. ........................... 354/402 |
| 5,270,763 | 12/1993 | Ogasawara ........................... 354/402 |
| 5,319,412 | 6/1994 | Hamada et al. . |
| 5,369,461 | 11/1994 | Hirasawa et al. ..................... 354/402 |
| 5,505,535 | 4/1996 | Kawasaki et al. ..................... 354/400 |

FOREIGN PATENT DOCUMENTS 2-15211 A  5/1989  Japan .

*Primary Examiner*—Daniel P. Malley
*Attorney, Agent, or Firm*—Oliff & Berridge

[57] ABSTRACT

A camera that can take photographs that are in focus without conducting a focus recognition action within the camera, having a configuration such that the required time needed for the shooting lens to reach the focus position is computed and a release is permitted in accordance with the required time. In addition, a configuration such that a determination is made whether it is possible for the shooting lens to reach the focus position and control of the timing release is made in accordance with the results of the determination.

20 Claims, 7 Drawing Sheets

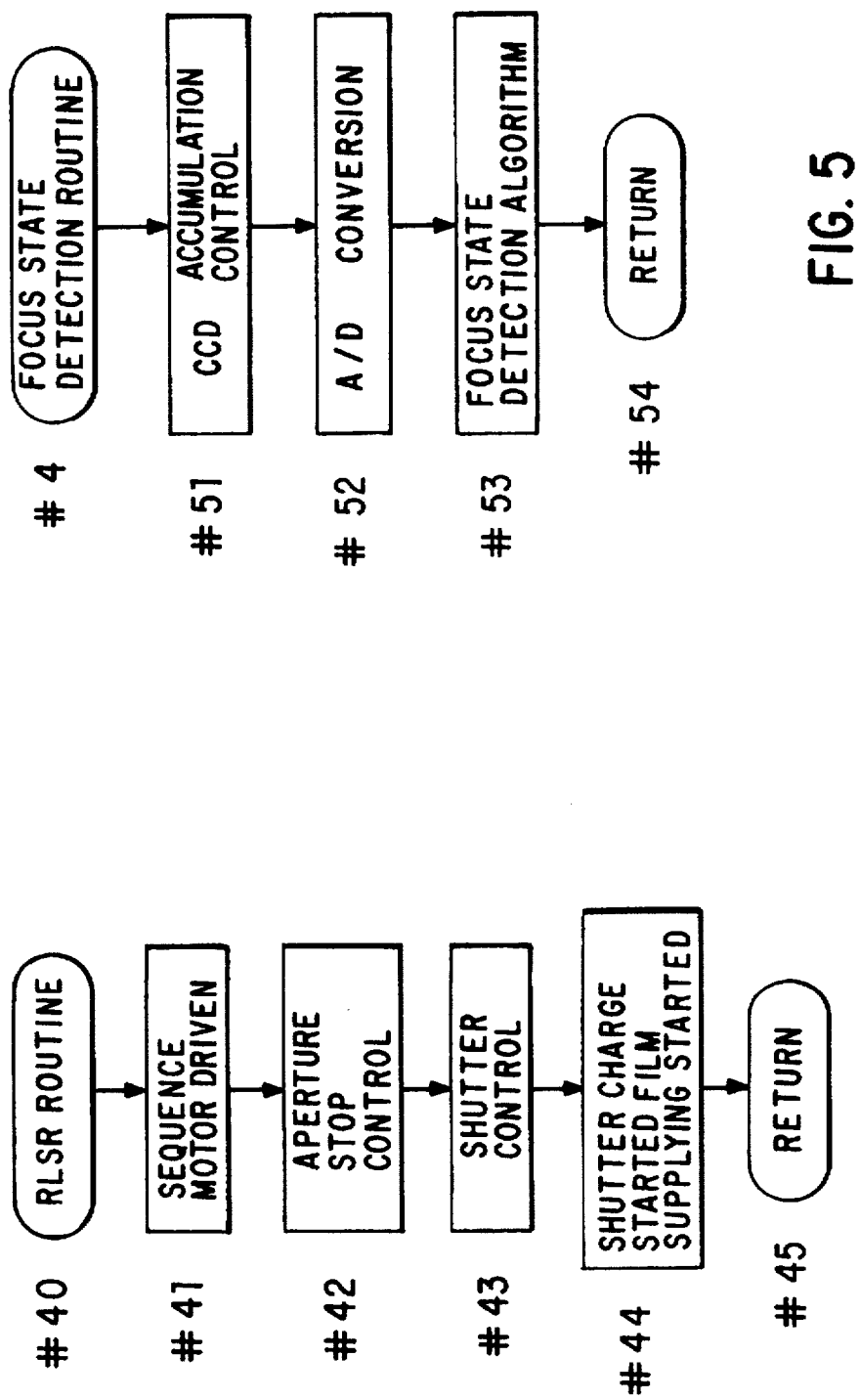

AUTOMATIC FOCUS CAMERA

BACKGROUND OF THE INVENTION

The invention relates to a camera capable of automatic focus (AF) adjustment and also capable of continuous photography.

Among cameras with automatic focus adjustment capabilities, there are those which are provided with a focus priority mode that does not permit a release when the lens is not in focus and those having a release priority mode which permits a release when the release is commanded, regardless of the focus adjustment state.

In addition, there is also a camera which is provided with a single photograph mode that conducts photography one frame at a time each time the release button is operated and with a continuous photography mode under which repeated frame exposures are possible while the release button is being operated one time.

However, in a camera with combination of the release priority mode and the continuous photography mode, the control is such that releases occur at predetermined intervals even if the lens is not in focus. Thus, with this kind of camera a release action is permitted even in the middle of driving the lens to the focus position (that is, after a predetermined time interval, even if the lens is not in the focus position) and consequently, a problem arises that the lens driving action is insufficient. As a result, photographs taken during this interval are taken even though the AF action is not completed resulting in photographs that are out of focus.

In addition, with a combination of the focus priority mode and the continuous photography mode, it is possible to take pictures that are in focus in all of the photography frames. However, a release cannot occur when the focus adjustment action has not been achieved so the problem arises that shutter chances, or picture opportunities, that are desired by the user are missed.

In order to resolve these and other problems, there is a camera that, during continuous photography, the photography is conducted under the release priority mode for the first photography frame, and is conducted under the focus priority mode for photography from the second frame on.

However, with this last type of conventional camera, during continuous photography the first photography frame is released as-is, while releases from the second frame on are prevented if the lens is not in a focussed state (that is, if the camera is not in state following the focus recognition action that recognizes that the lens is in a focussed state). Consequently, the problem arises that frame speed, which is a major factor when conducting continuous photography, is decreased.

SUMMARY OF THE INVENTION

It is an object of the invention to provide a camera that can take photographs that are in focus without conducting a focus recognition action within the camera.

It is another object of the invention to provide a camera which is user friendly while also suppressing large decreases in frame speed and enabling the taking of pictures that are in focus even from the second frame on when automatic focus (AF) photography is conducted during continuous photography.

In order to resolve the problems of conventional cameras, the invention is an automatic focus camera having a shift amount detection means which detects information relating to the shift amount between the shooting lens position and the focus position with respect to the subject; an automatic focus adjustment means which automatically controls driving of the shooting lens toward the focus position on the basis of the above information relating to the shift amount; an algorithm means which computes the required time needed for the shooting lens to reach the focus position on the basis of the above information relating to the shift amount; and a control means which permits driving of the shutter in accordance with the required time. Thus, the required time needed for the shooting lens to reach the focus position is computed and a release in permitted is accordance with the required time. Consequently, photographs that are in focus are possible even without conducting a focus recognition action within the camera and it also becomes possible to shorten release timing.

Further, in the camera of the invention, if the determination is made that the time required for the lens to reach the focus position is too long, information relating to the most recent shift amount is detected and the required time needed for the lens to reach the focus position is computed again on the basis of the newest detection result. Consequently, it is possible to conduct lens driving control with higher precision. In such a camera, a release is prevented until the required time recomputed from the newest data has elapsed, and consequently, there are almost no cases of photographs being taken that are out of focus.

In addition, the invention is directed to an automatic focus camera comprising a shift amount detection means which detects information relating to the shift amount between the shooting lens position and the focus position with respect to the subject; an automatic focus adjustment means which automatically controls driving of the shooting lens toward the focus position on the basis of the above information relating to the shift amount; a determination means which determines whether it is possible for the shooting lens to reach the focus position on the basis of the above information relating to the shift amount; and a release timing control means which controls the timing that permits shutter driving in accordance with the determination results from the determination means. With this camera, the determination is made whether the shooting lens can reach the focus position and release timing is controlled on the basis of the results of the determination. Consequently, photographs that are in focus are possible even without conducting a focus recognition action within the camera and it also becomes possible to shorten release timing.

Further, in such a camera, the required time needed for the shooting lens to reach the focus position is computed and the release timing is determined on the basis of the required time. In addition, if the determination is made that the time required for the lens to reach the focus position is too long, information relating to the most recent shift amount is detected and the required time needed for the lens to reach the focus position is computed again on the basis of the newest detection result. Consequently, it is possible to conduct lens driving control with higher precision.

Lastly, a release is prevented until the required time recomputed from the newest data has elapsed. Consequently, there are almost no cases of photographs being taken that are out of focus.

With the camera of the invention as described above, the required time needed for the shooting lens to reach the focus position is computed and a release is permitted in accordance with the required time, or the determination is made as to whether it is possible to cause the shooting lens to reach the focus position and the release timing is controlled in accordance with the results of the determination. Consequently, photographs that are in focus are possible even without conducting a focus recognition action within the camera and it also becomes possible to shorten the release timing.

With the camera of the invention, control is conducted in accordance with the driving capabilities of the motor provided in the camera, so it is possible to conduct lens driving control with a high degree of precision. When a lens barrel having a motor in the lens barrel is mounted on the camera, control is conducted in accordance with the driving capabilities of the motor provided in the lens barrel, so it is possible to conduct lens driving control with a high degree of precision.

Further, the shutter release timing is given priority for the first frame during continuous photography, so shutter chances are not missed. In addition, from the second frame on, lens driving is conducted in order to effect focussing, but the configuration is such that a release action is executed after further conducting focus state detection and without conducting focus recognition actions after the lens is driven as before. Consequently, it is possible to take photographs that are in focus while maintaining a fast frame speed and it is also possible to obtain an easy to use camera.

BRIEF DESCRIPTION OF THE DRAWINGS

The invention will be described with reference to the drawings, in which:

FIG. 4 is a flowchart showing the actions of a camera microcomputer performed in a release sequence routine;

FIG. 5 is a flowchart showing the actions of the camera microcomputer performed in a focus state detection process routine;

DETAILED DESCRIPTION OF THE PREFERRED EMBODIMENTS

Figure 1:
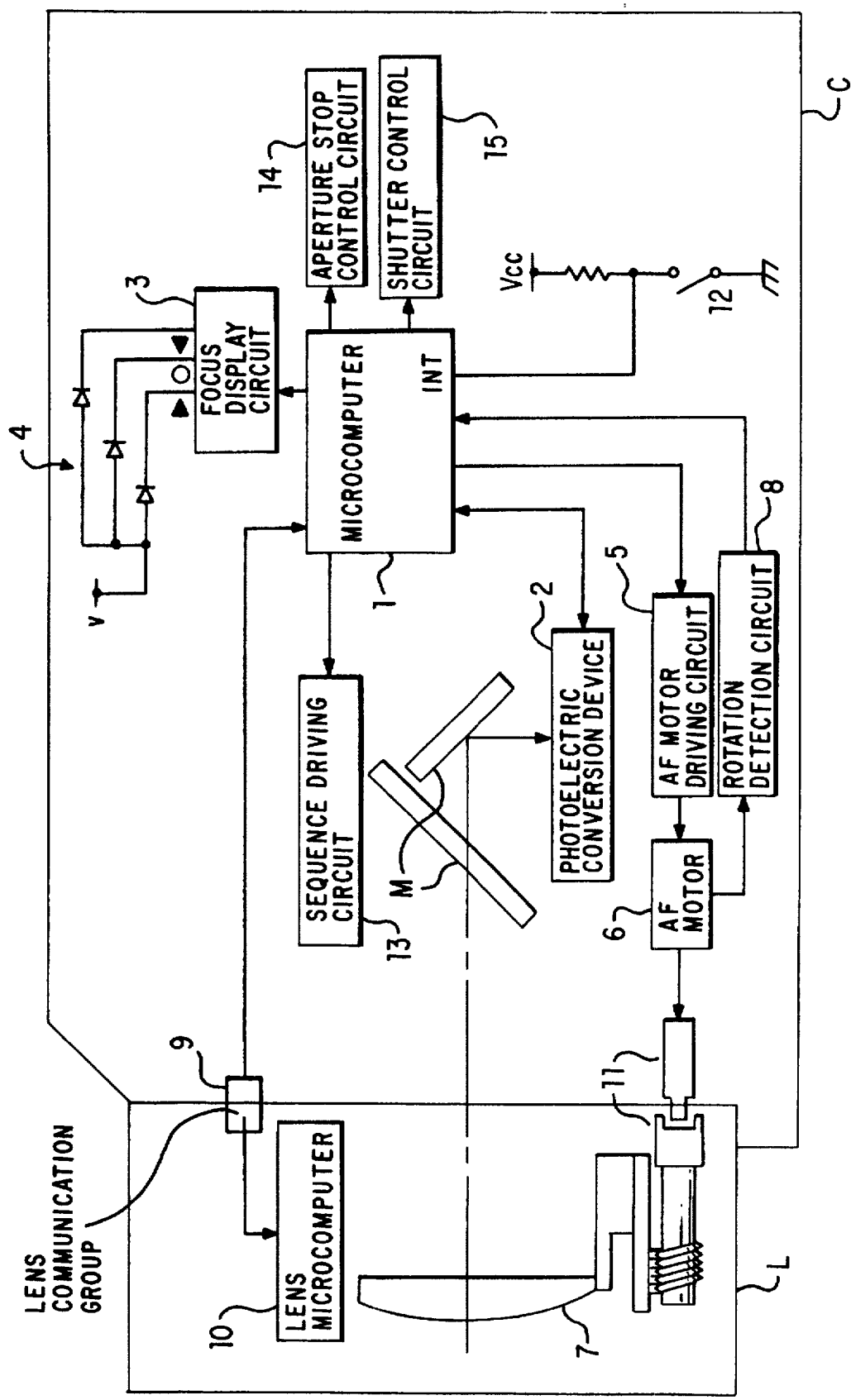
FIG. 1 is a camera block diagram of a first embodiment of a camera of the invention.

FIG. 1 is a block diagram showing a camera according to a first preferred embodiment of the invention. A microcomputer 1, or the operating equivalent, which controls the camera is provided within the camera body C. The microcomputer 1 is a single chip microcomputer which has an A/D converter, ROM, RAM (which records below-described lens information) and the like, and is also equipped with a serial communication function, a timer function, and an external interruption function.

A photoelectric conversion device 2 (e.g., a CCD) is connected to the microcomputer 1. The photoelectric conversion device 2 is a device which receives a portion of the light rays from the subject which pass through the shooting lens and the output from this device is input into the A/D conversion terminal of the microcomputer 1 and is used in the microcomputer 1 for focus state detection. In addition, a focus display driving circuit 3 is connected to the microcomputer 1. The focus display driving circuit 3 drives displays on the display in the display 4, in the invention an LED display is used, in accordance with the results of focus state detection results obtained from the microcomputer 1. The LED 4 displays, through the display configuration thereof, the present focus adjustment state (in-focus, front focus or rear focus).

An automatic focus (AF) motor driving circuit 5 is connected to the microcomputer 1. The AF motor driving circuit drives the AF motor 6 on the basis of focus state detection results obtained from the microcomputer 1. The AF motor 6 is mechanically coupled to a mechanical coupling shaft 11 and driving control is conducted toward the desired focus position (in-focus position) of the optical system 7 within the lens barrel L through the control of the rotation of the motor 6 (that is to say, through the coupling shaft 11).

A rotation detection circuit 8 (e.g., a photo-interrupter), which generates a pulse in accordance with the rotation of AF motor 6, is connected to AF motor 6. The output from the rotation detection circuit 8 is input into the microcomputer 1. The configuration is such that the microcomputer 1 can recognize the amount of rotation of the AF motor 6.

The microcomputer 1 can conduct serial communication with the lens microcomputer 10 within the lens via a lens communication group 9. Through this serial communication, the microcomputer obtains the lens information (described below) necessary when conducting automatic exposure (AE) and automatic focus (AF) adjustment.

In addition, the microcomputer 1 is also connected to an aperture stop control circuit 14 which controls the desired aperture stop value of an aperture stop (not shown) within the lens barrel L, a shutter control circuit 15 which controls a shutter (not shown) in order to obtain the desired exposure time, and a sequence driving circuit 13 which drives a sequence motor (not shown). The sequence driving circuit 13 is a component which raises and lowers the mirror and charges the shutter through driving the sequence motor.

One end of a release switch 12, which is turned on by the depression of an external operation member, i.e., release button (not shown), is connected to the external interruption terminal of the microcomputer 1. The microcomputer 1 can detect the depressing of the release button through the input state of the external interruption terminal. The actions of a camera, having the above structure, are described in detail below with reference to flowcharts for the microcomputer 1 of FIGS. 2 through 6 and FIGS. 8 and 9, and with reference to FIG. 7 which shows the relationship between driving and release.

Figure 2:
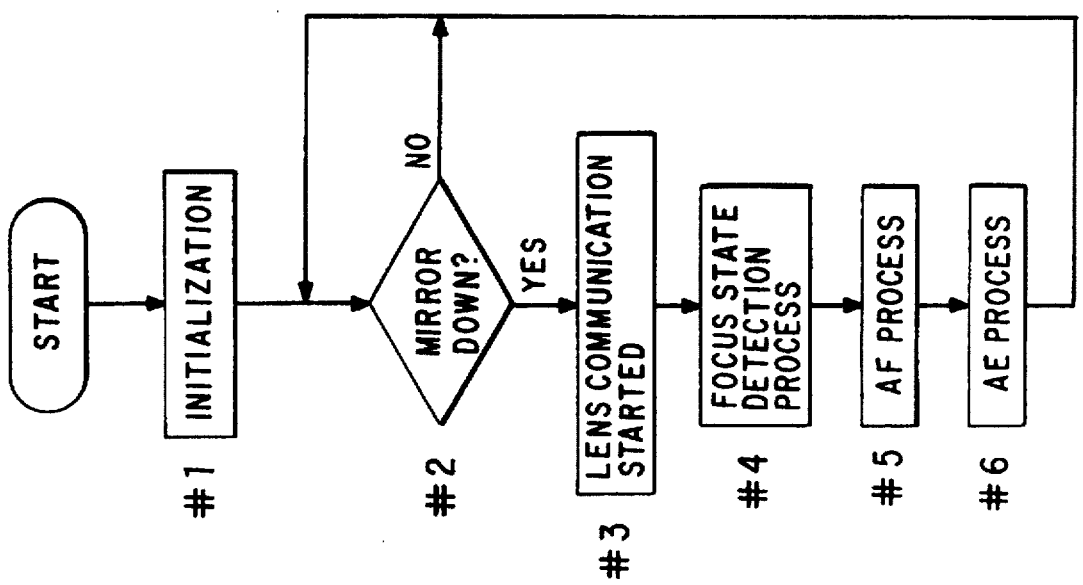
FIG. 2 is a flowchart showing the camera actions of the first embodiment.

In FIG. 2, the actions of the camera start when a power source switch (half-depressed switch) (not shown) is turned ON. The flowchart of the present embodiment shows the actions of a camera when the continuous photography mode is set.

In step #1, the memories, such as the RAM, are initialized, and initial settings are made for the various function members, such as the timer, serial communication, A/D conversion and ports. The program then moves to step #2.

In step #2, a determination is made whether the mirror M, which is composed of a main mirror and an auxiliary mirror, is down (i.e., whether the mirror is in the shooting position). If the mirror is down, the program moves to step #3. If the mirror is up, the program waits for the mirror to be lowered.

In step #3, serial communication is started in order to obtain the lens information (e.g., focal length information, completely open F-number information, image plane displacement information per rotation of the mechanical coupling shaft 11, and the like) necessary for AE and AF, and the program continues to step #4.

In step #4, the focus state detection process described below and shown in FIG. 5, is conducted and the program proceeds to step #5.

Figure 6:
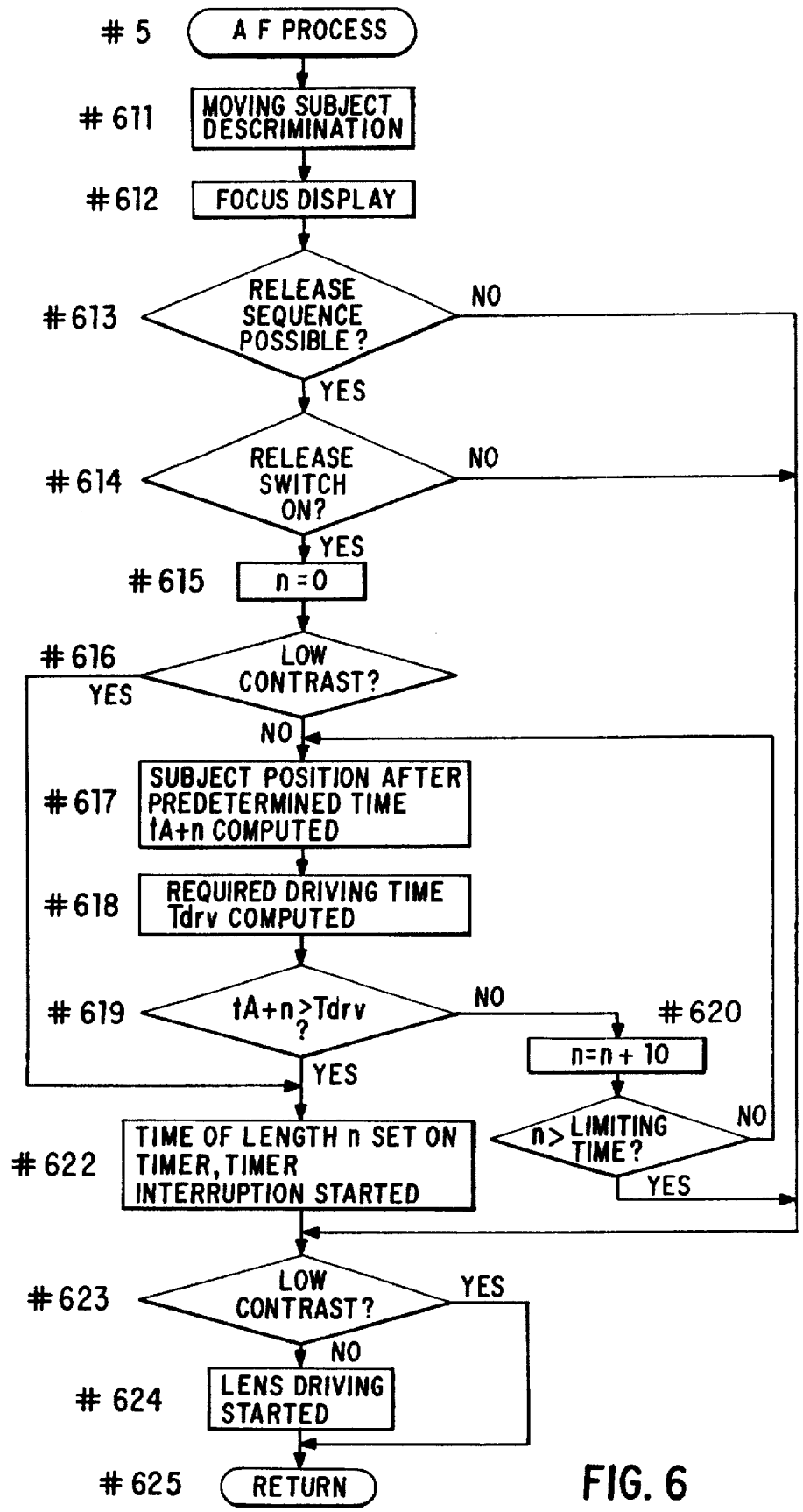
FIG. 6 is a flowchart showing the actions of the camera microcomputer performed in an automatic focus (AF) process routine.

In step #5, the AF process, described in detail below with reference to FIG. 6, is conducted which displays the focus adjustment state in accordance with the detected focus state and also starts lens driving. The program then moves to step #6.

Figure 9:
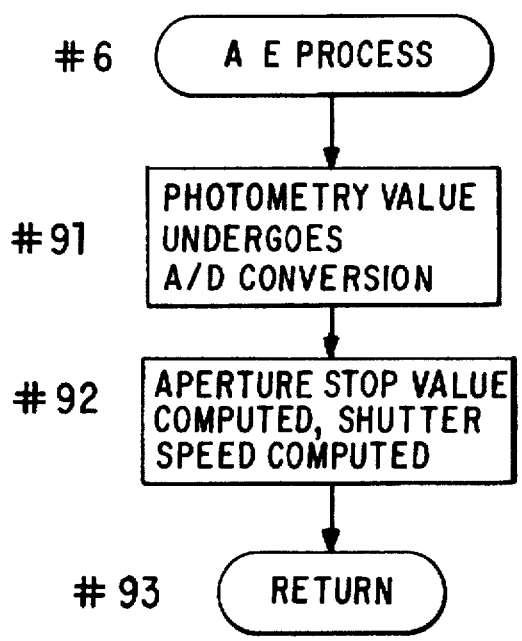
FIG. 9 is a flowchart showing the actions of the camera microcomputer performed in particular in an automatic exposure (AE) process routine.

In step #6, the output of an photometry circuit (not shown) is read and an AE process, described hereafter with reference to FIG. 9, is conducted which computes the shutter speed and the aperture stop value that is to be controlled at the time of exposure. The computations are made on the basis of the photometry results. Following this, the program returns to step #2, and repeats the above-described processes so long as the power source switch is ON.

The flowchart in FIG. 2 is repeatedly executed while the half-depressed switch is closed (ON) and the release switch 12 is not closed (i.e., it is OFF). When the release switch 12 is closed (i.e., is turned ON) during the processes in FIG. 2, the level of the external interruption terminal INT of the microcomputer 1 changes from H to L. When this occurs, an external interruption request is generated within the microcomputer 1 in response to this change in the level of the terminal INT, and the microcomputer 1 promptly starts the INT interruption process shown in FIG. 3. In step #31, the release process routine "RLSR", shown in FIG. 4, is called.

When the below-described RLSR process, shown in FIG. 4, has been completed, in step #32 the return address is changed to the address of step #2 in FIG. 2.

In step #33, the program returns to the flow of FIG. 2 and the processes are restarted from step #2.

Figure 3:
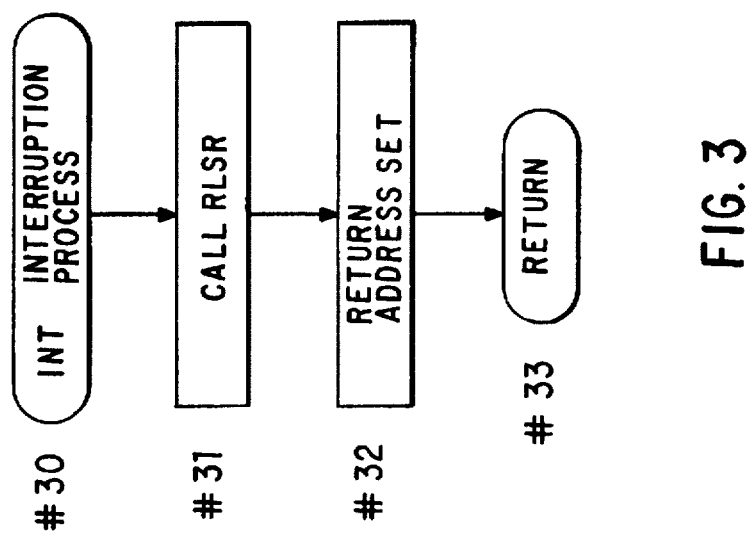
FIG. 3 is a flowchart of the first embodiment showing the interruption routine when the release button is depressed.

FIG. 4 shows the flow of the release process routine "RLSR" that is step #31 of FIG. 3. In step #41, a sequence motor (not shown) is started and the mirror raising action starts. At that time, the program moves to step #42.

In step #42, the aperture stop (not shown) of the shooting lens is controlled to the desired aperture stop value computed in above-described step #6 (the AE process, details of which are explained with reference to FIG. 9 below). Following this, the program goes to step #43.

In step #43, the shutter is controlled so as to achieve the desired shutter speed computed in the above-described step #6, in a manner similar to step #42, so that an exposure action is conducted. Following this, the program moves to step #44.

In step #44, the shutter charge action is conducted by the sequence motor (not shown) while the film supply action is conducted by a film supply motor (not shown). Following this, the program, in step #45, returns to the flow immediately following the calling of the routine, that is, to step #32 of FIG. 3.

As described above, at the time of the first opening of the release switch accompanying a release operation (when the INT terminal level changes from H to L), that is to say, at the time of the first photography action in continuous photography, control is such that the flow in FIG. 3 is promptly entered and the release process of FIG. 4 is conducted. Consequently, at the time of the first photograph during continuous photography, the release action is conducted with no dependency on the focus state detection results or the focus adjustment action (in other words, is conducted under the release priority mode).

FIG. 5 will now be used to discuss the focus state detection process in above-described step #4 of FIG. 2.

In step #51, CCD accumulation control is conducted and the program then moves to step #52. In step #52, the image data obtained by the CCD is accepted by the A/D converter of the microcomputer 1 and the program continues to step #53.

In step #53, a known focus state detection algorithm is conducted (for example, see U.S. Pat. No. 4,561,749 for a discussion of focus detection). As one method of focus state detection computation, a method is known wherein a correlation algorithm is conducted using the CCD image data, for example. As the computational results of the focus state detection, the defocus amount of the shooting lens with respect to the subject at the time of CCD accumulation is obtained. In addition, the computational results are not necessarily limited to obtaining a defocus amount, for one type of computational result can be determining low contrast, for example, if the value that indicates the amount of correlation during computations does not satisfy a predetermined threshold value (contrast), i.e., is smaller than a predetermined threshold value. Following this, in step #54 the program returns to execute the process of step #5 in FIG. 2.

Figure 7:
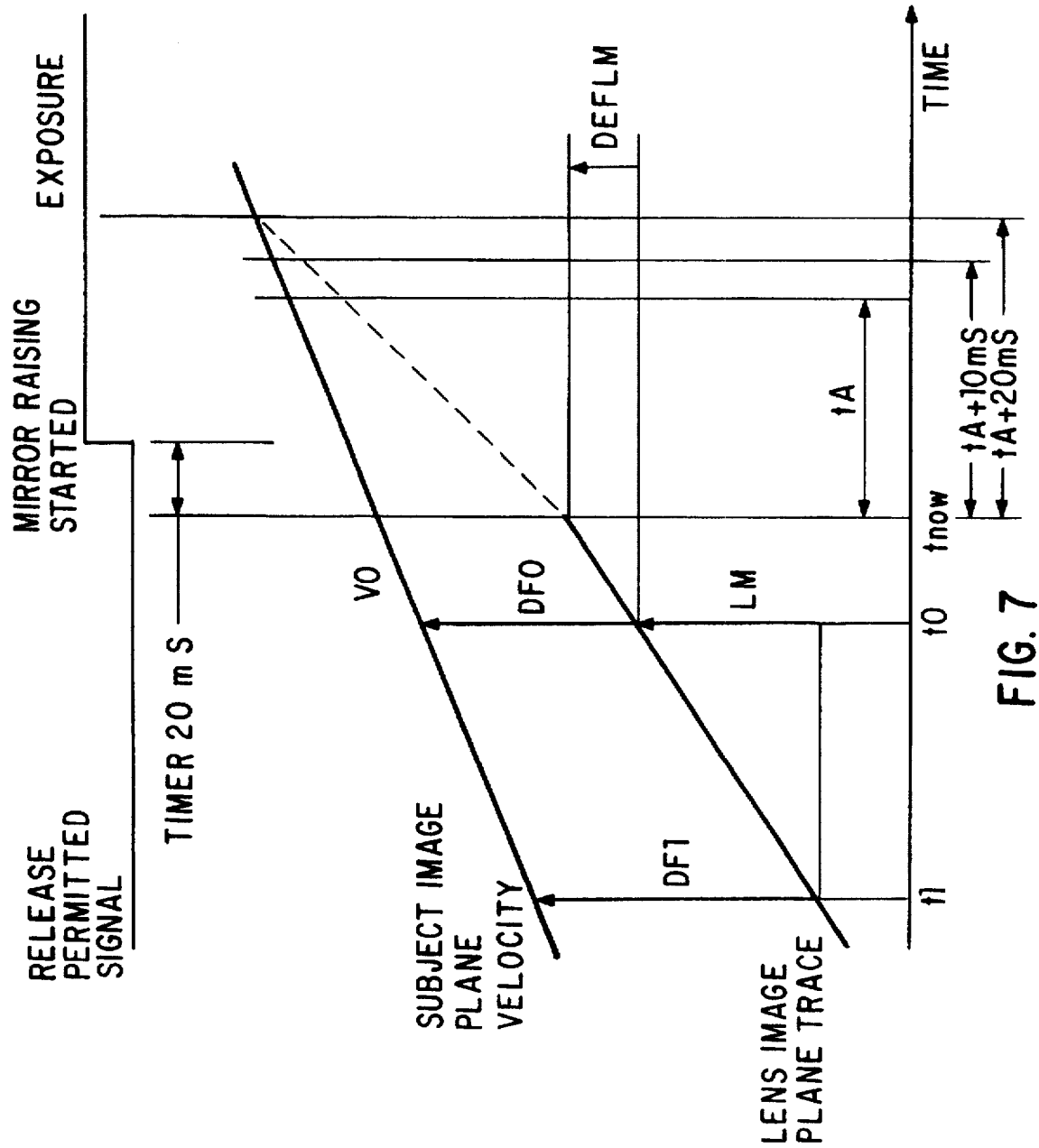
FIG. 7 is a drawing showing the AF action, subject image position and release action of a camera relating to the invention.

FIG. 6 is a flowchart showing the AF process of step #5 in FIG. 2. In addition, FIG. 7 is a summary drawing showing the relationship between the subject movement and the lens movement relating to the AF process and the release, as relates to the AF process shown in FIG. 6. Hereafter, the flow of FIG. 6 will be described, with the description of FIG. 7 interspersed therein.

In step #611, a predetermined moving subject discrimination is conducted. This is accomplished by finding the subject image plane displacement per unit time interval, i.e., the subject image plane movement velocity, from the repeatedly obtained defocus amounts of the shooting lens with respect to the subject, the CCD accumulation time when this defocus amount was obtained, and the lens displacement. The discrimination is the subject is moving when the subject moving image plane velocity computed in this way is at least as great as a predetermined amount.

For example, as shown in FIG. 7 the CCD accumulation action is conducted at times t1 and t0, which differ. Calling DF1 and DF0 the respective focus state detection defocus amounts and LM the lens displacement over which the lens has moved during this time, the subject moving image plane velocity can be obtained from the following Equation 1.

$$V0 = (DF0 + LM - DF1)/(t0 - t1) \tag{1}$$

In step #612, the display driving circuit 3 is driven and produces a focus information display, a display of the present focus adjustment state using LED 4. The display is made on the basis of the focus state detection results and moving subject discrimination results from step #611.

In step #613, a determination is made whether the release sequence, described in FIG. 4, has been completed and the next release sequence action (the next exposure action) is possible. Here, sequence completion means completion of both the shutter charge action and the film supply action. If the sequence has not been completed, the program moves to step #623 without the below-described timer being started. If, on the other hand, the sequence has been completed, the program moves to step #614.

In step #614, the level of the release switch 12 is determined and a determination is made whether the release switch has remained on continuously even after the first exposure action. When the level is L (the release switch ON state has been continued), the program moves to step #615. Alternatively, if the level is H (the release switch has been turned off), the program moves to step #623 without the described timer being started.

In step #615, the elapsed time constant n (in units of mS) is set to an initial value of 0, and the program continues to step #616. With the present embodiment, the elapsed time constant n is increased in increments of 10 mS, but this is intended to be illustrative and not limiting, for it would also be fine for n to be changed in increments of a value that is desirable in accordance with the structure of the camera being used.

In step #616, a determination is made whether the focus state detection result obtained through the flowchart in FIG. 5 is low contrast. If the result is low contrast, the program moves to step #622, while if the result is not low contrast, the program moves to step #617.

In step #617, the position predicted as the subject image position, in the case of either a stationary or a moving subject, after a predetermined time tA+n is computed, where tA is the time from the start of a release, i.e., from when the release switch is turned ON, until the mirror raising action and aperture stop control actions have been completed and the camera is in a state where shutter action is possible, i.e., when exposure is possible.

In step #618, the driving time Tdrv (required driving time) required for the shooting lens to reach the subject image position computed in step #617 is computed. The computation of this required driving time Tdrv is conducted on the basis of information stored beforehand in the ROM relating to the driving amount of the AF motor 6 per unit time, i.e., the driving speed. With the invention, a fixed value is used as the information relating to the driving speed of the AF motor, but this is intended to be illustrative and not limiting, for it would also be appropriate to, for example, measure the power source voltage, correct the driving speed value in the ROM accompanying fluctuations in the power source voltage, and use the computed driving speed value in accordance with the power source voltage in the computation of the required driving time.

In the next step #619, a comparison determination is made of the relative sizes of tA+n and Tdrv. If tA+n>Tdrv, the determination is made that driving by the desired amount (the driving amount required to reach the computed subject position) is possible prior to the start of the actual exposure so the program moves to step #622. If the relationship tA+n>Tdrv does not hold, the program proceeds to step #620.

In step #622, a timer interruption of length n is started. In this step, the timer function in the microcomputer 1 is started, the time interval n is set on the timer, and when the timer has completed measuring the time interval of length n, the program moves to the timer interruption process described below using FIG. 8. When n is 0, no time is measured when the timer is started, so the program moves immediately to the timer interruption process of FIG. 8.

In step #620, when tA+n>Tdrv, 10 mS is added to n, and the program goes to step #621. In step #621, a determination is made whether n, set in step #620, exceeds a predetermined limiting time.

The predetermined limiting time is a time stored beforehand in the ROM. A limit for n is provided for the following reasons. When the focus state detection action is conducted, it is preferable to conduct the detection action on the basis of the most recent CCD accumulation data. However, when n is large and the timer time (the time required for driving of the lens to the subject image position) is lengthened, the position the lens reaches after the long timer time has elapsed, and the timer time, is not desirable because when the timer time has elapsed, control is conducted on the basis of CCD accumulation data which has become old. If there is time to conduct another CCD accumulation and focus state detection algorithm during the lens driving time (prior to the lens reaching the subject image position) on the basis of the old data, CCD accumulation and the focus state detection algorithm can be conducted again even during lens driving on the basis of the old data, so that new data can be obtained, and the focus state detection action can be conducted on the basis of this new data such that lens driving control, with a higher degree of precision, is possible.

When n exceeds the predetermined limiting time, the program moves to step #623 without the timer being started. When n does not exceed the limiting time, the program returns to step #617, calls tA the time from the start of another release to the start of an exposure, and computes the subject position after a predetermined time tA+n.

In FIG. 7, the case is shown wherein the determination is that it is possible to complete lens driving to the subject image position in n=20 mS. In this way, the time needed to effect focussing on the desired subject is found, the timer time (n in the case of the embodiment) is set on the basis of this time, and the timer is started.

In step #623, a determination is made whether the contrast is low. If the contrast is low, the program moves to step #625 without movement of the AF lens being started, while if the contrast is not low, the program moves to step #624.

In step #624, lens driving is started in order to cause the desired amount of driving of the AF lens and the program then moves to step #625. In step #625, the program returns to step #6 of FIG. 2.

The method of computing the subject position after a predetermined time tA+n in above-described step #617, and the method of computing the required driving time Tdrv in step #618 will be described hereafter with reference to FIG. 7.

In FIG. 7, calling now the present time, t0 the CCD accumulation time, DF0 the defocus amount as a focus state detection result, V0 the subject image plane velocity, DEFLM the defocus conversion lens driving amount from the CCD accumulation time to the present time, and tA the time from the start of a release to the start of an exposure, the subject image position Dtgt, after a predetermined time tA+n has elapsed after the present time now, can be expressed with the following Equation 2.

$$Dtgt = (now - t0) * V0 + (tA + n) * V0 + DF0 - DEFLM \quad (2)$$

When the subject is not moving (in the case of a stationary subject), the computation is made with $V0=0$ in the above formula.

In addition, the required driving time Tdrv (in mS) can be computed from the following Equation 3 in accordance with the capabilities of the AF motor, in the camera body, on the basis of information recorded in the ROM, from a converted driving amount found by converting the above-described Dtgt to a camera body AF motor driving amount using the lens data and the image plane displacement per rotation of the mechanical coupling shaft 11.

$$Tdrv=(P-15)*3+(P-30)*2+(P-45)+(P-65)/2+(P-100)/5+5 \quad (3)$$

Here, P is the motor displacement converted into a pulse number and terms that end up negative are replaced with a 0.

Figure 8:
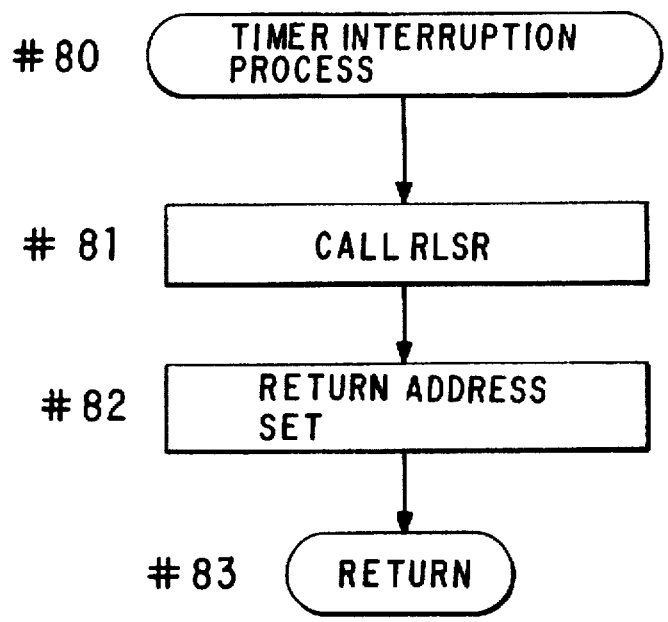
FIG. 8 is a flowchart showing the actions of the camera microcomputer performed in a photography routine from the second frame on during continuous photography.

FIG. 8 is a flowchart showing the "timer interruption process" that is started when time measuring by the timer has been completed. The timer interruption process is a routine with the same process contents as the above-described "INT interruption process" of FIG. 3, so the details are omitted here.

FIG. 9 is a flowchart showing the AE process of step #6 of FIG. 2. In step #91, the output of a photometry circuit (not shown) undergoes A/D conversion and the program moves to step #92.

In step #92, computations of the shutter speed value and the aperture stop value that yield the appropriate exposure value are conducted using a well known method on the A/D converted output of the photometry circuit from step #91. Following this, the program returns to step #2 shown in FIG. 2.

Figure 10:
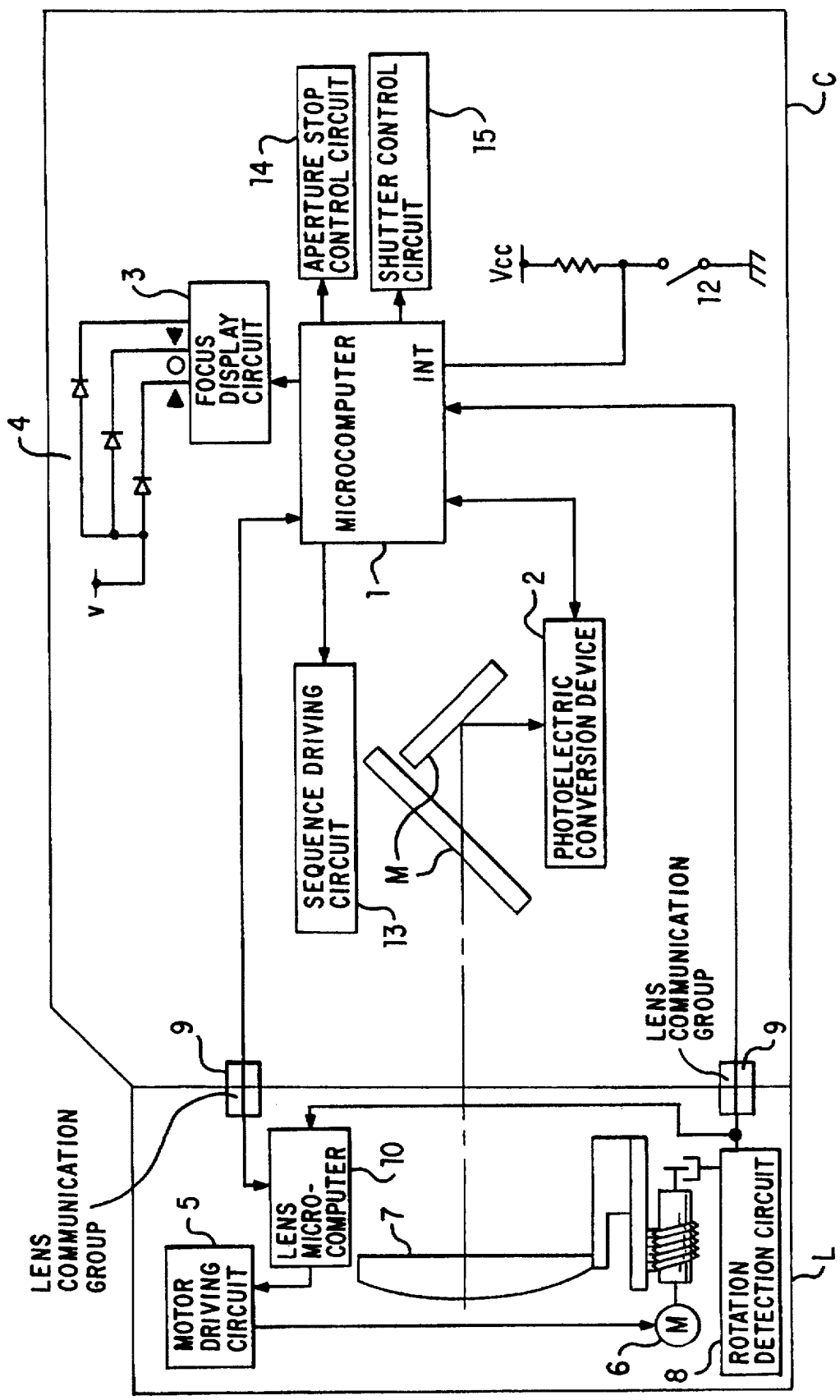
FIG. 10 is a block diagram of a second embodiment of a camera relating to the invention.

FIG. 10 is a block diagram showing a second embodiment of the invention. With this second embodiment, the configuration is such that a motor is provided within the lens barrel. Components having the same functions as the components of the first embodiment (FIG. 1) are labelled with the same symbols as used in FIG. 1.

The output of the rotation detection circuit 8 is input into the lens microcomputer, or equivalent control element, 10 as information concerning the displacement of the motor, i.e., the lens movement amount, and is also output to the microcomputer 1 in the camera body via the lens communication group 9.

In this second embodiment, the processing shown in the flowchart of FIG. 6 can essentially be applied. However, the method of computing the required driving time Tdrv of step #618 differs from the first embodiment. The reason for this is that the drive capabilities of the motor differ depending on the lens barrel that is mounted on the camera body so it is not desirable to apply the above-described Equation 3, which was formulated on the premise that a fixed motor in the camera body is used, directly to the present embodiment. In addition, another reason is that when a lens equipped with motor with high drive capabilities (a motor which can complete driving over the same distance in an extremely short time) is developed in the future, time would be wasted.

Because of this, in order to enable the computation of the driving time in accordance with the various capabilities of the lens that is mounted, in the second embodiment the driving time of the motor of the lens, in accordance with a predetermined driving amount, is transmitted from the mounted lens to the RAM in the camera as data through serial communication beforehand. Thus, an interpolation algorithm for the driving time can be conducted in accordance with the desired driving amount.

A method can be considered as this interpolation algorithm wherein the values in the following table are used, for example, if Dtgt were a value between 250 μm and 500 μm, t is then found from Equation (4):

$$(t-60)/(Dtgt-250)=(80-60)/(500-250). \quad (4)$$

Table 1 is an example of the driving amount information and the driving time information sent from the lens to the camera body when a particular lens is mounted on the camera body. The starting of lens driving in step #624 is achieved by sending a driving amount to the lens through serial communication.

TABLE 1

| driving amount | driving time |
| --- | --- |
| 125 μm | 40 mS |
| 250 μm | 60 mS |
| 500 μm | 80 mS |
| 1000 μm | 90 mS |
| 2000 μm | 100 mS |
| 3000 μm | 120 mS |

The invention is not limited to the embodiments described above. Those skilled in the art will understand that various modifications can be made to the disclosed embodiments without departing from the scope of the invention.

What is claimed is:

1. An automatic focus camera, comprising:
   a shooting lens;
   a shutter;
   shift amount detection means which detects information relating to a shift amount between a shooting lens position and a focus position with respect to a subject;
   automatic focus adjustment means which automatically controls driving of the shooting lens toward the focus position on the basis of the above information relating to the shift amount;
   algorithm means which computes a required time needed for the shooting lens to reach the focus position on the basis of the information relating to the shift amount; and
   control means which permits driving of the shutter in accordance with the required time, said camera further comprising:
   means for detecting a release operation to determine whether or not a release action is to be conducted; and
   means for controlling the release action so that, if the release operation detection means determines to perform the release action and if the required time is longer than a release time lag of the camera, then the release action starts after a delayed time which corresponds to at least the difference between the required time and the release time lag.

2. The automatic focus camera of claim 1, further comprising:
   comparison means which makes a comparison between the required time and a predetermined time;
   re-driving means which causes the shift amount detection means to again detect information relating to the shift amount when the required time is larger than the predetermined time, and causes the algorithm means to recompute the required time again on the basis of the information relating to the shift amount which has been detected again.

3. The automatic focus camera of claim 2, wherein when the required time is larger than the predetermined time, the shutter driving is halted until the required time which was obtained through operation of the re-driving means has elapsed.

4. The automatic focus camera of claim 1, wherein the automatic focus adjustment means includes a motor for driving the shooting lens and the algorithm means computes the required time on the basis of driving capabilities of the motor.

5. The automatic focus camera of claim 1, wherein the camera can communicate with the shooting lens, the shooting lens includes a motor which is driven by the automatic focus adjustment means, and the algorithm means computes the required time on the basis of information relating to driving capabilities of the motor obtained from the shooting lens.

6. The automatic focus camera of claim 1, wherein the camera is capable of continuous photography in which shutter driving is repeatedly conducted, and the camera further comprises:

a release operation member which can be operated externally and which drives the shutter when an operation is applied;

release detection means for detecting whether an operation has been applied to the operation member; and continuous release determination means for determining whether a photography action is a photography action of a first frame in continuous photography or the photography action is a photography action of a second frame or later, said control means permitting shutter driving in accordance with the detection made by the release detection means, regardless of the focus adjustment state of the automatic focus adjustment means, when it is determined by the continuous release determination means that the photography action is the photography action of the first frame and permitting shutter driving after the required time interval when it is determined by the continuous release determination means that the photography action is the photography action of the second frame or later.

7. An automatic focus camera, comprising:

a shooting lens;

a shutter;

shift amount detection means for detecting information relating to a shift amount between a shooting lens position and a focus position with respect to a subject;

automatic focus adjustment means for automatically controlling driving of the shooting lens toward the focus position on the basis of the information relating to the shift amount;

determination means for determining whether it is possible for the shooting lens to reach the focus position on the basis of the information relating to the shift amount; and, release timing control means for controlling a timing that permits shutter driving in accordance with a determination from the determination means, said camera further comprising:

means for detecting a release operation to determine whether or not a release action is to be conducted; and means for controlling the release action so that, if the release operation detection means determines to perform the release action and if the required time is longer than a release time lag of the camera, then the release action starts after a delayed time which corresponds to at least the difference between the required time and the release time lag.

8. The automatic focus camera of claim 7, wherein the determination means includes algorithm means for computing a required time needed for the shooting lens to reach the focus position, computation of the required time made on the basis of information relating to the shift amount and the release timing control means determines a timing for shutter driving in accordance with the required time.

9. The automatic focus camera of claim 8, further comprising:

comparison means for making a comparison between the required time and a predetermined time; and re-driving means for causing the shift amount detection means to again detect information relating to the shift amount when the required time is larger than the predetermined time, and causes the determination means to conduct a determination again on the basis of the information relating to the shift amount which has been detected again.

10. The automatic focus camera of claim 9, wherein when the required time is larger than the predetermined time, the shutter driving is halted until the required time which was obtained through operation of the re-driving means has elapsed.

11. The automatic focus camera of claim 8, wherein the automatic focus adjustment means includes a motor for driving the shooting lens and the algorithm means computes the required time on the basis of driving capabilities of the motor.

12. The automatic focus camera of claim 8, wherein the camera can communicate with the shooting lens, the shooting lens includes a motor which is driven by the automatic focus adjustment means, and the algorithm means computes the required time on the basis of information relating to driving capabilities of the motor obtained from the shooting lens.

13. The automatic focus camera of claim 8, wherein the camera is capable of continuous photography in which shutter driving is repeatedly conducted, and the camera further comprises:

a release operation member which can be operated externally and which drives the shutter when an operation is applied;

release detection means for detecting whether an operation has been applied to the operation member; and continuous release determination means for determining whether a photography action is a photography action of a first frame in continuous photography or a photography action is a photography action of a second frame or later, said control means permitting shutter driving in accordance with the detection made by the release detection means, regardless of the focus adjustment state of the automatic focus adjustment means, when it is determined by the continuous release determination means that the photography action is the photography action of the first frame and permitting shutter driving after the required time interval when it is determined by the continuous release determination means that the photography action is the photography action of the second frame or later.

14. A method for exposing a plurality of film frames in an automatic focus camera during a single operation of an operation member, comprising the steps of:

detecting information relating to a shift amount between a shooting lens position and a focus position with respect to a subject;

controlling driving of a shooting lens toward the focus position based on the shift amount;

determining a required time for the shooting lens to reach the focus position based on the shift amount;

driving a shutter at the end of the required times;

detecting a release operation to determine whether or not a release action is to be conducted; and controlling the release action so that, if the release operation detection means determines to perform the release action and if the required time is longer than a release time lag of the camera, then the release action starts after a delayed time which corresponds to at least the difference between the required time and the release time lag.

15. The method according to claim 14, further comprising the steps of:

comparing the required time with a predetermined time;

redetecting the shift amount when the required time is longer than the predetermined time; and redetermining the required time for the shooting lens to reach the focus position based on the redetected shift amount.

16. The method according to claim 15, wherein when the required time is larger than the predetermined time, driving of the shutter is halted until the predetermined required time has passed.

17. The method according to claim 14, wherein the required time is determined based upon capabilities of a motor for driving the shooting lens.

18. The method according to claim 15, wherein the motor is in the shooting lens, further requiring a step of communicating with the shooting lens to obtain capabilities of a motor for driving the shooting lens.

19. The method according to claim 14, further comprising the steps of:

determining whether an operating member has been operated;

determining whether the operating member has been continuously operated; and determining whether an operation of the operating member has just occurred to constitute a first frame photography action or the operation of the operating member has continued past the first frame photography action to a second frame or later photography action.

20. The method according to claim 19, wherein the step of driving the shutter for a first frame photography action occurs immediately without regard to the required time and driving the shutter for a second or subsequent frame photography action occurs only at the end of the required time.

* * * * *